United States Patent [19]
Denton et al.

[11] 3,858,984
[45] Jan. 7, 1975

[54] OPTICAL PLUMB LEVELER

[75] Inventors: Howard M. Denton, Dallas; Martin Luther Slagle, Palmer, both of Tex.

[73] Assignee: APL Enterprises, Inc., Garland, Tex.

[22] Filed: June 8, 1973

[21] Appl. No.: 368,248

[52] U.S. Cl. .............................. 356/250, 356/153
[51] Int. Cl. ........................................... G01c 9/12
[58] Field of Search .......... 356/153, 248, 250, 138, 356/172; 331/94.5

[56] References Cited
UNITED STATES PATENTS
| | | | |
|---|---|---|---|
| 3,588,249 | 6/1971 | Studebaker | 331/94.5 |
| 3,635,565 | 1/1972 | Colson | 356/153 |
| 3,771,876 | 11/1973 | Ljungdahl et al. | 356/153 |

Primary Examiner—William L. Sikes
Attorney, Agent, or Firm—Clarence A. O'Brien; Harvey B. Jacobson

[57] ABSTRACT

An optical plumb leveler having a cylindrical housing mounted on a support by a universal joint. A weight connected to the cylindrical housing alignes a beam emanating from a battery-powered lamp within the housing along a plumb line. Lenses may be used as desired to condense and project the beam onto a surface to which a point is to be transferred. An adapter unit employing a planar mirror is selectively arrangeable on the cylindrical housing with the mirror at a 45° angle to the beam for reflecting it 90° from plumb and into a horizontal plane to indicate a point level with the device.

14 Claims, 10 Drawing Figures

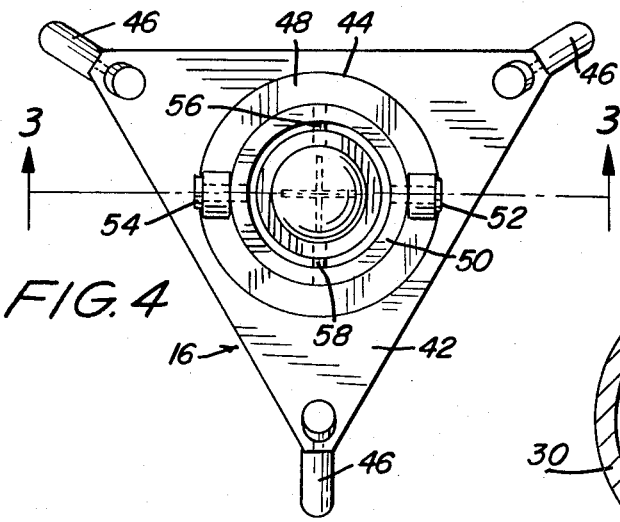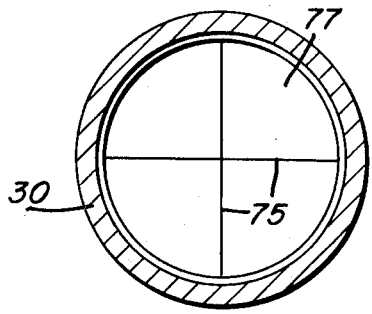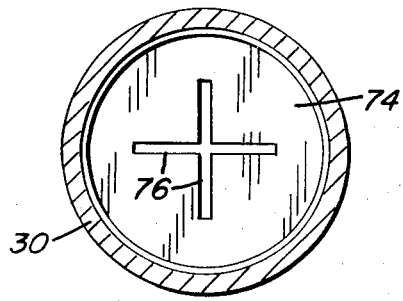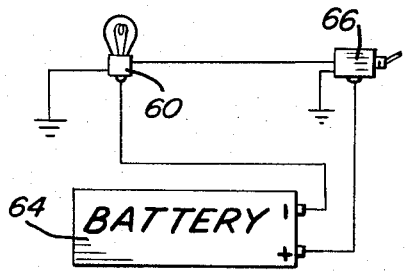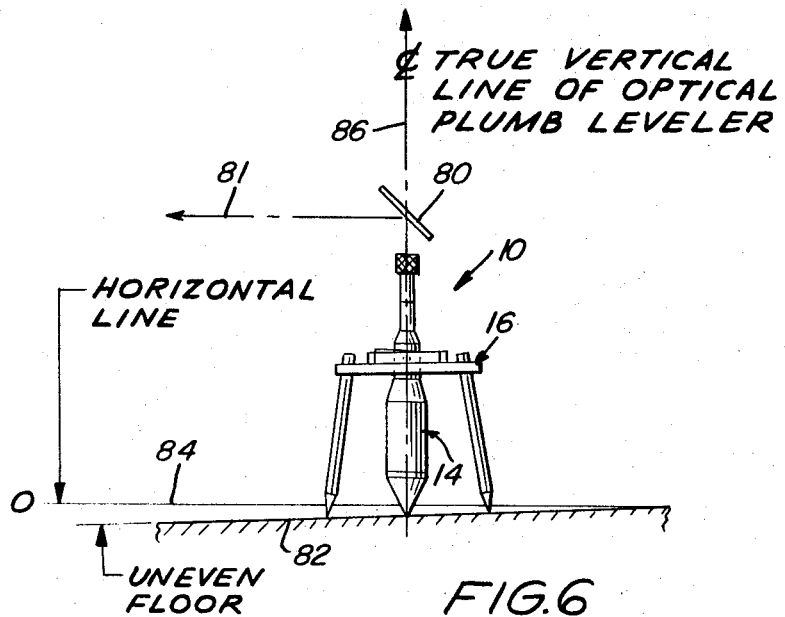

OPTICAL PLUMB LEVELER

BACKGROUND OF THE INVENTION

1. Field of the Invention

This invention relates generally to a light-ray indicator, and particularly to apparatus for automatically indicating a point perpendicular to or horizontally from a predetermined point.

2. Description of the Prior Art

It is known to project a light beam aligned along a plumb line for transferring markings from one point to another on the plumb line. Devices employing this concept usually have a lamp mounted on a support by a universal joint, and a weight functioning as a plumb bob attached to the lamp for aligning same along a plumb line.

It is also known to project a light beam horizontally for surveying, and the like. An example of apparatus for this purpose may be found in U.S. Pat. No. 3,469,919.

SUMMARY OF THE INVENTION

It is another object of the present invention to provide light-ray plumb apparatus of improved construction.

It is another object of the present invention to provide an adapter unit permitting an optical plumb to be used as a leveler.

These and other objects are achieved according to the present invention by providing a plumb leveler having: a support; a housing provided with an opening; a universal joint movably mounting the housing on the support; and a radiation source arranged with the housing for emitting a radiation beam through the housing opening. A conical-shaped weight is attached to the housing for functioning as a plumb bob and orienting the housing with the radiation beam aligned along a plumb line.

According to a preferred embodiment of the present invention, the housing is a hollow cylinder provided with a tapered portion and a pair of spaced, opposed, open ends. Advantageously, one of these open ends forms the housing opening through which the radiation beam emanates from the housing. The universal joint may be connected to the housing in the tapered portion, which is arranged substantially mid-way in the longitudinal extent of the hollow cylinder.

A preferred universal joint according to the present invention has a pair of concentric rings pivotally attached to one another at diametrically opposed points, with an inner one of the rings pivotally connected to the housing and an outer one of the rings affixed to the support. The inner ring is connected to the housing also at diametrically opposed points arranged in a plane at right angles to a plane passing through the pivot points connecting the inner and outer rings. The support advantageously includes a platform provided with a flanged inner opening receiving the outer ring such that the part forms an extension of the outer ring. A plurality of legs are mounted on the platform and extend codirectionally therefrom for supporting the platform and housing. A lens may be adjustably mounted at the beam-emanating opening of the cylinder for projecting the beam onto a selected surface, while a further lens may be arranged in the housing between the radiation source, which may be a lamp, and the adjustable projecting lens for condensing the beam. An element provided with an opening forming an X-pattern may be arranged in the cylinder between the radiation source and projecting lens to provide an image in the form of an X or cross.

Apparatus according to the present invention may be used as a leveler by using an adapter unit according to the present invention. This adapter unit may include a tubular housing selectively arrangeable to fit over the cylinder at the beam-emanating end. A planar mirror, and the like, is advantageously mounted in the housing so as to be at a 45° angle to the beam emanating from the housing and reflecting that beam 90° from plumb and into a horizontal plane.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 4 is a top plan view looking in the direction of arrows 4-A of FIG. 3.

FIG. 5 is a detail, sectional view taken generally along the line 5—5 of FIG. 3.

FIG. 6 is a schematic, side elevational view showing various operations of a plumb leveler according to the present invention.

FIG. 7 is a schematic diagram showing a lamp circuit for an optical plumb leveler according to the present invention.

FIG. 8 is a detail, section view similar to FIG. 5, but showing a modified cross hair baffle.

DESCRIPTION OF THE PREFERRED EMBODIMENTS

Figure 1:
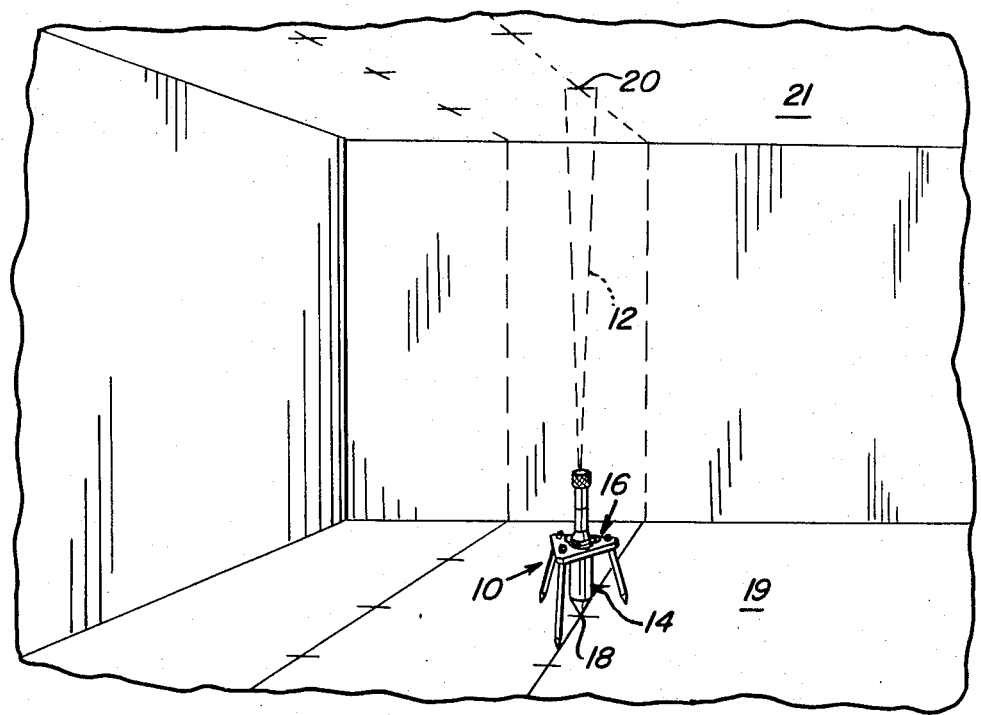
FIG. 1 is a fragmentary, perspective view showing an optical plumb leveler being used to transfer a point from a floor to a ceiling.
Figure 2:
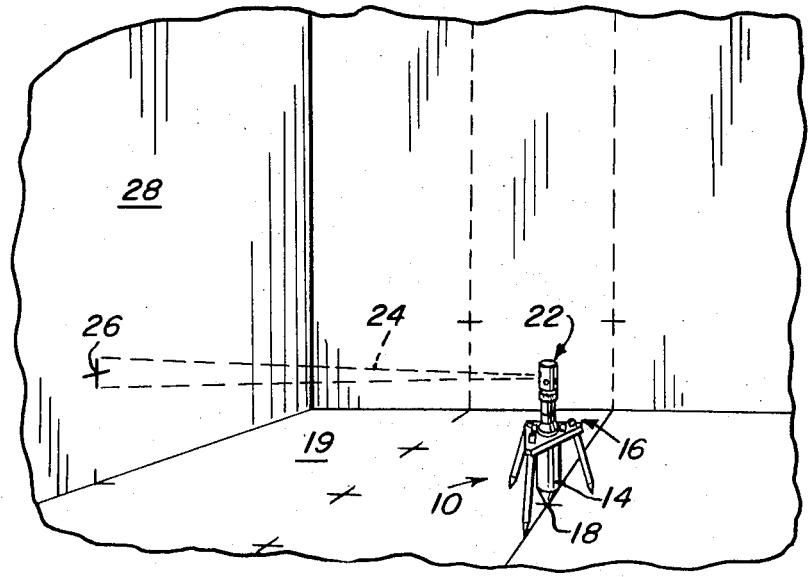
FIG. 2 is a fragmentary, perspective view, showing an optical plumb leveler according to the present invention being used as a leveler.

FIGS. 1 and 2 of the drawings shown an optical plumb leveler 10 according to the present invention. In FIG. 1, a light beam 12 is shown emanating from a housing 14 movably mounted on a support 16 for transferring a mark 18 from a point on floor 19 to a mark 20 at a plumb point on a ceiling 21. FIG. 2 shows an adapter unit 22 according to the present invention arranged on housing 14 in the path of beam 12 for reflecting same 90 degrees from plumb and into a horizontal plane. In this manner, mark 14 can be transferred by reflected beam 24 to a corresponding mark 26 on a wall 28.

Figure 3:
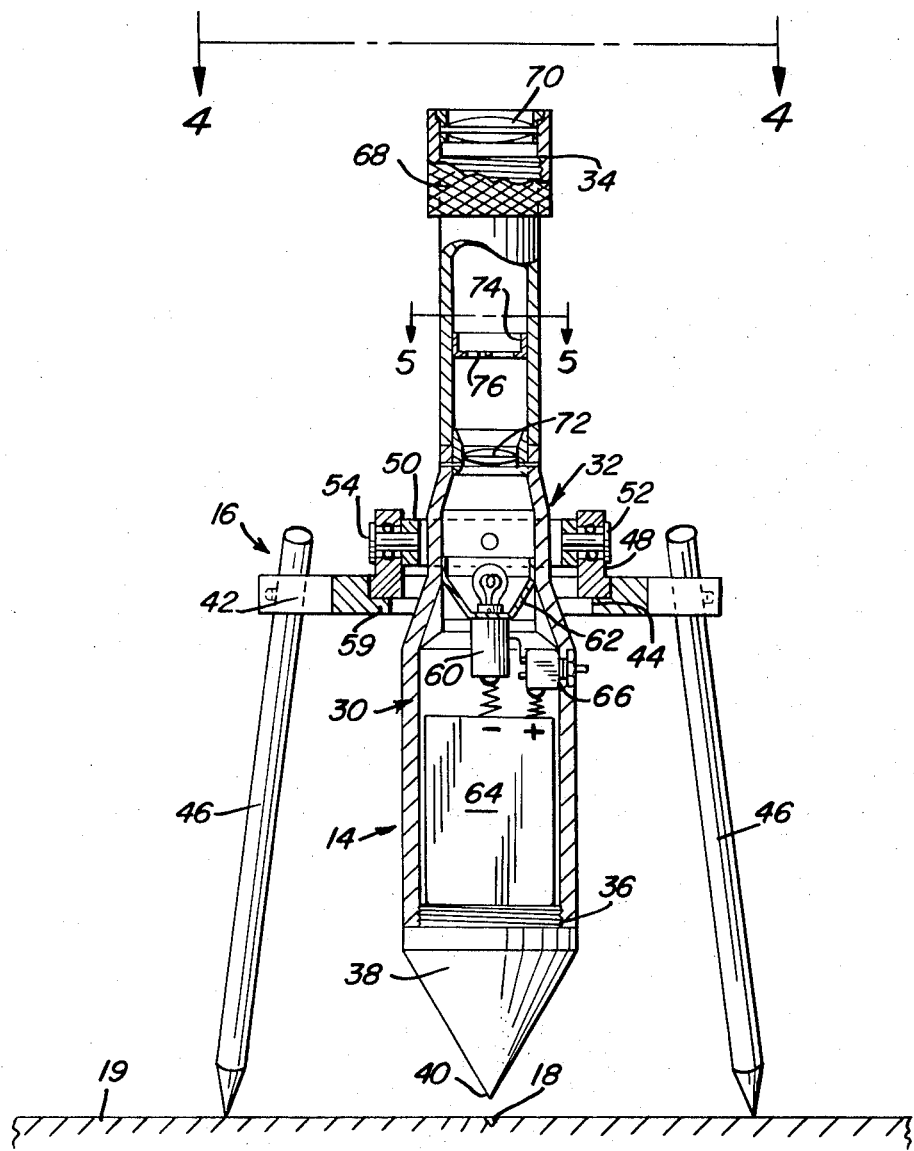
FIG. 3 is a fragmentary, side elevational view, partly cut away and taken in section generally along the line 3—3 of FIG. 4, showing an optical plumb leveler according to the present invention.

Referring now to FIGS. 3 and 4 of the drawings, housing 14 is in the form of a hollow cylinder 30 provided with a tapered portion 32 and a pair of spaced, opposed, open ends 34 and 36. End 34 forms an opening in housing 14 through which passes beam 12. A conically-shaped member 38, constructed from a dense material such as steel, is connected in a suitable manner as illustrated to end 36 of cylinder 30 for functioning as a weight or plumb bob and orienting cylinder 30 with its longitudinal axis aligned along a plumb line. Member 38 is advantageously mounted by screw threads as shown so as to block open end 36. Point 40 of member 38 facilitates positioning of the longitudinal axis of cylinder 30, which is also the longitudinal axis of beam 12, with relation to a mark 18 in a floor 19.

Support 16 includes a platform 42 having a triangular plan and a centrally located, circular opening 44 and a plurality, in this instance three, legs 46 extending co-directionally from platform 42 for supporting same. The universal joint is formed by a pair of concentric rings 48 and 50 pivotally attached to one another at diametrically opposed points as by pins 52 and 54. The inner ring 50 is pivotally connected to cylinder 30 at tapered portion 32 as by diametrically opposed pins 56 and 58 arranged between pins 52 and 54. Outer ring 48 is arranged in opening 44 of platform 42, flange 59 being advantageously provided for assisting in retaining ring 48 in the opening. As can readily be appreciated from FIG. 3, tapered portion 32 of cylinder 30 is arranged substantially mid-way with respect to the longitudinal extent of cylinder 30.

Light beam 12 is emitted by a suitable radiation source such as a conventional lamp 60 (FIGS. 3 and 7). A reflector 62 of frusto-conical configuration is arranged together with lamp 60 in tapered portion 32 of cylinder 30 adjacent the universal joint and toward end 36. Reflector 62 is directed to cause beam 12 to emanate from end 34 of cylinder 30. A conventional battery 64 and switch 66 are connected to lamp 60 in a suitable manner, such as that shown in FIG. 7, to actuate lamp 60 and create beam 12. It is to be understood that the wiring may be changed to a circuit different from but equivalent to that shown in FIG. 7. Either A.C. or D.C. current may be used, as desired.

A sleeve 68 is mountable on end 34 of cylinder 30 as by screw threads for selective movement parallel to the longitudinal extent of cylinder 30. A conventional, double-convex lens 70 is mounted in a conventional manner in sleeve 68 for movement with sleeve 68, and is arranged to be in the path of beam 12. This lens 70 functions as a projecting lens. An additional double-convex lens 72 is shown as affixed in cylinder 30 between end 34 and lamp 60 to function as a condensation lens.

An element in the form of a baffle 74 (FIGS. 3 and 5) is advantageously arranged in cylinder 30 between lamp 60, and lens 72 if used, and end 34. This baffle 74 is provided with an opening 76 in the form of an X-pattern which will cause beam 12 to form an image in the form of a cross hair.

FIG. 8 shows a modified baffle, formed as by photographing a cross hair 75 in a known manner onto a clear lens 77, and the like.

Figure 9:
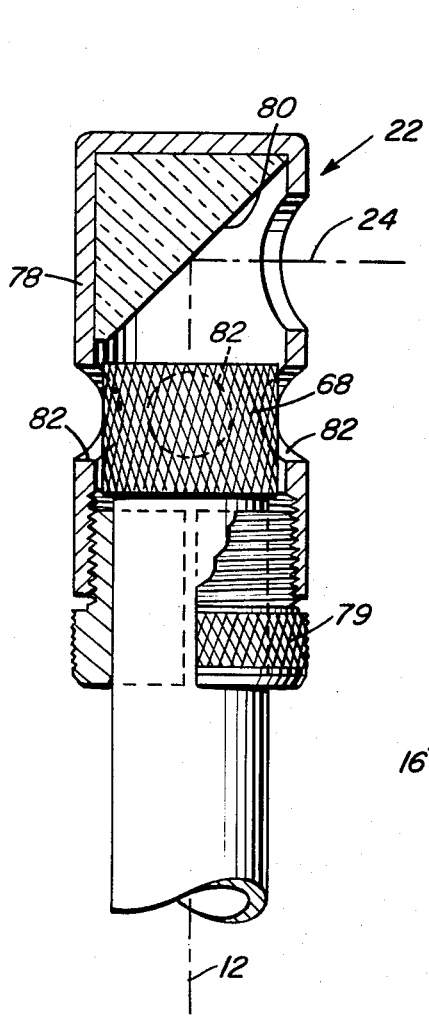
FIG. 9 is a fragmentary, vertical sectional view of a level adaptor unit according to the present invention.

Referring again to FIG. 9 of the drawings, the tubular housing 78 of unit 22 is selectively arrangeable to fit over cylinder 30 from end 34. A half-nut 79 is provided to cooperate with screw threads on housing 78 to hold the latter on cylinder 30. A mirror 80 (FIG. 6), of any suitable known construction, is arranged so as to be at a 45° angle to beam 12 and reflect same 90° from plumb and into a horizontal plane. This horizontal plane is indicated by the arrow designated 81 in FIGS. 6 and 9 of the drawings. The height of adapter unit 22 above platform 42 may be selectively variable as by providing apertures 82 in housing 78 to permit access to sleeve 68 and adjusting the sleeve, and thereby housing 78 and mirror 80, on cylinder 30. In this manner, the height of the horizontal plane may be varied.

FIG. 6 of the drawings shows a line designated as a center line which is simultaneously the longitudinal axis of cylinder 30, the longitudinal axis of beam 12, and a plumb line. FIG. 6 particularly shows how a plumb leveler 10 according to the present invention may be positioned on an uneven floor 82 at an angle to horizontal line 84 and still provide a plumb line 86.

A plumb leveler 10 according to the present invention may be actuated simply by actuation of switch 66 which closes the circuit between lamp 60 and battery 64. The apparatus may now be used in a known manner to transfer markings from, for example, a floor to a ceiling or wall.

Figure 10:
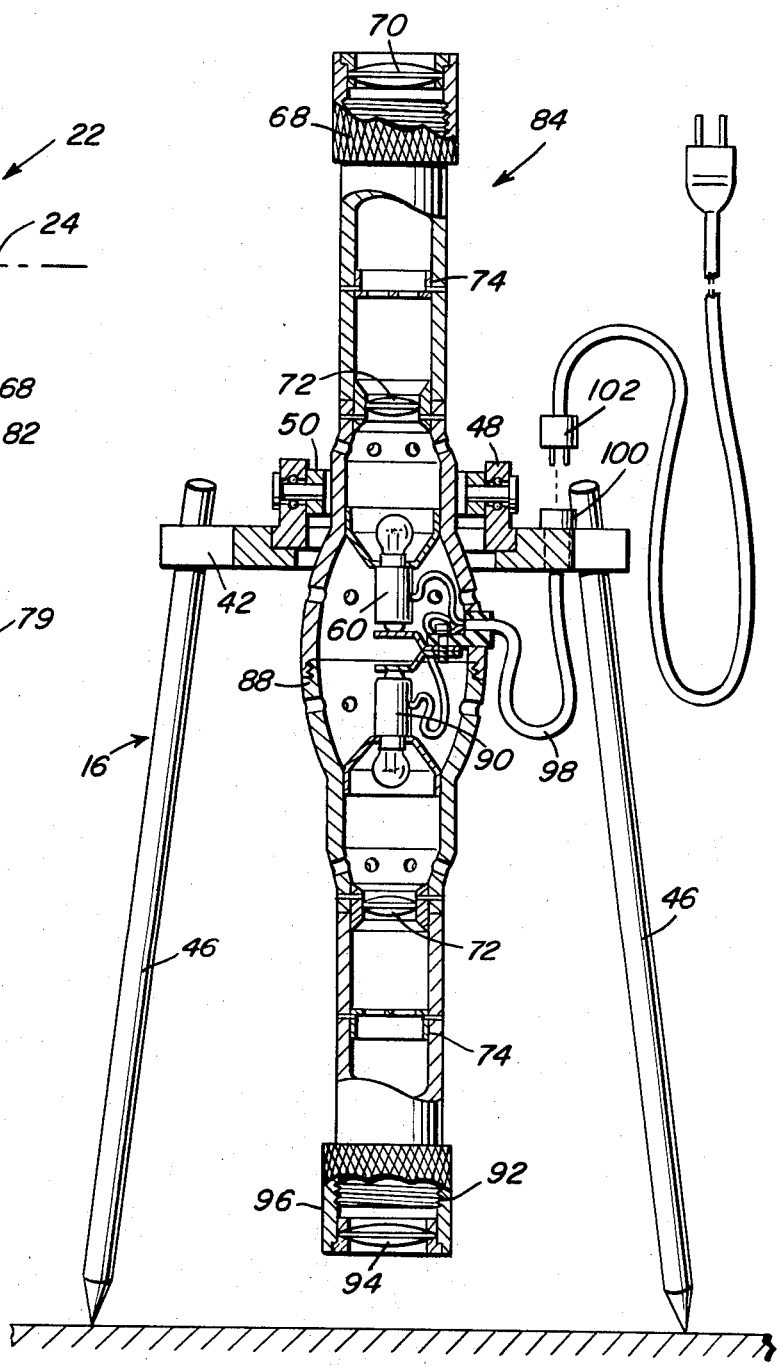
FIG. 10 is a fragmentary, side elevational view, partly out away and taken in section, showing a modified embodiment of the present invention.

FIG. 10 of the drawings shows a modified embodiment 84 of the invention. A support 16 identical to that shown in FIG. 3 supports a cylinder 86 housing a lamp 60, lenses 70, 72, and a baffle 74 or 76. Also arranged extending into a bulged portion 88 of cylinder 86 together with lamp 60 is a further lamp 90 directed toward an end 92 of cylinder 86. A lens 94 and sleeve 96, similar to lens 70 and sleeve 68, are arranged at this end 92 for condensing a beam from lamp 90. Flexible electrical cord 98 lead from lamps 60, 90, out of cylinder 86, and to a receptacle 100 provided in platform 42. An on-off switch (not shown) is associated with the receptacle 100. A conventional electrical plug 102 may be selectively inserted in receptacle 100 to light the lamps. Top portion 104 of cylinder 86 may be constructed from a light-weight material, such as aluminum, while bottom portion 106 should be constructed from a heavy material, such as steel, so as to weight the bottom and keep the instrument plumb. The illustrated position of the universal connection to cylinder 86 also contributes to vertical, or plumb, alignment of the cylinder.

Instrument 84 differs from plumb leveler 10 in that it replaces the plumb-bob member 38 with a light-beam from lamp 90. This feature is usual in, e.g., work such as drilling plumb holes in oil fields, and the like. By placing instrument 84 directly of a hole (not shown) the beam from lamp 60 can be used to align a drill bit, while the beam from lamp 90 will be projected down the hole to point out true center.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plumb leveler, comprising, in combination:
 a. a support;
 b. a housing having an opening;
 c. means for movably mounting the housing on the support;

d. a radiation source arranged within the housing for emitting a radiation beam through the housing opening; and e. means mounted on the housing for orienting same with the radiation beam aligned along a plumb line, the housing being a hollow cylinder provided with a tapered portion and a pair of spaced, opposed, open ends, one of these open ends forming the housing opening, and the orienting means being a conical member constructed from a dense material for functioning as a weight and mounted on the housing blocking the other of the open ends.

2. A structure as defined in claim 1, wherein the tapered portion of the cylinder is arranged substantially mid-way of a longitudinal extent of the cylinder, and the mounting means is connected to the tapered portion.

3. A structure as defined in claim 2, wherein the radiation source is a lamp provided with a reflector and arranged in the tapered portion of the cylinder adjacent the mounting means displaced toward the other end while directed toward the one end.

4. A structure as defined in claim 3, further including lens means having a sleeve mountable on the one end of the cylinder for selective movement parallel to the longitudinal extent of the cylinder, and a double-convex lens mounted in the sleeve for movement therewith and arranged to be in a path of the radiation beam.

5. A structure as defined in claim 4, wherein the lens means further includes an additional double-convex lens affixed in the cylinder between the one end and the lamp.

6. A structure as defined in claim 5, further including an element provided with an opening forming an X-pattern and arranged in the cylinder between the lamp and the lens means.

7. A structure as defined in claim 1, further including an adapter unit including a tubular housing with a one leg selectively arrangeable to fit over the cylinder at the one open end and means mounted in the tubular housing for reflecting the radiation beam 90° from plumb and into a horizontal plane.

8. A structure as defined in claim 7, wherein the reflecting means in a planar mirror arranged in the path of the radiation beam and at an angle of 45° with respect to the direction of travel of the beam.

9. A plumb leveler, comprising, in combination:
a. support,
b. a housing having an opening;
c. means for movably mounting the housing on the support, the housing mounting means being a universal joint including a pair of concentric rings pivotally attached to one another at diametrically opposed points, with an inner one of the rings pivotally connected to the housing and an outer one of the rings affixed to the support, the inner ring connection being at diametrically opposed points; and
d. a radiation source arranged within the housing for emitting a radiation beam through the housing opening.

10. A structure as defined in claim 9, further including means mounted on the housing for orienting same with the radiation beam aligned along a plumb line.

11. A structure as defined in claim 9, wherein the support includes a platform connected to and forming an extension of the outer ring, and a plurality of legs extending from the platform for supporting same.

12. A plumb leveler, comprising, in combination:
a. a support;
b. a housing having an opening;
c. means for movably mounting the housing on the support;
d. a radiation source arranged within the housing for emitting a radiation beam through the housing opening; and
e. a further opening provided in the housing and arranged opposed to the opening, and a further radiation source arranged in the housing for emitting a further radiation beam through the further opening, the further beam being opposed to the radiation beam.

13. A structure as defined in claim 12, further including lens means adjustably mounted on the housing and arranged in a path of the radiation beam.

14. A plumb leveler, comprising, in combination:
a. a support;
b. a hollow housing having a pair of spaced, opposed, open ends;
c. means for movably mounting the housing on the support;
d. a radiation source arranged within the housing for emitting a radiation beam through one of the open ends of the housing; and
e. means including a member constructed from a dense material and mounted on the housing blocking the other of the ends of the housing for functioning as a weight and orienting the housing with the radiation beam aligned along a plumb line.

* * * * *